(12) United States Patent
Bonderson et al.

(10) Patent No.: US 8,076,666 B2
(45) Date of Patent: Dec. 13, 2011

(54) USE OF SACK GEOMETRY TO IMPLEMENT A SINGLE QUBIT PHASE GATE

(75) Inventors: Parsa Bonderson, Santa Barbara, CA (US); Kirill Shtengel, South Pasadena, CA (US); David Clarke, Riverside, CA (US); Chetan Nayak, Santa Monica, CA (US)

(73) Assignee: Microsoft Corporation, Redmond, WA (US)

( * ) Notice: Subject to any disclaimer, the term of this patent is extended or adjusted under 35 U.S.C. 154(b) by 194 days.

(21) Appl. No.: 12/549,774

(22) Filed: Aug. 28, 2009

(65) Prior Publication Data

US 2010/0264402 A1   Oct. 21, 2010

Related U.S. Application Data

(60) Provisional application No. 61/170,227, filed on Apr. 17, 2009.

(51) Int. Cl.
*H01L 29/00*   (2006.01)
*H01L 29/06*   (2006.01)

(52) U.S. Cl. ............................................. 257/9; 257/30
(58) Field of Classification Search ................. 257/9, 30
See application file for complete search history.

(56) References Cited

U.S. PATENT DOCUMENTS

| | | | |
|---|---|---|---|
| 7,018,852 | B2 | 3/2006 | Wu |
| 7,250,624 | B1 | 7/2007 | Freedman |
| 7,427,771 | B2 | 9/2008 | Freedman |
| 7,529,717 | B2 | 5/2009 | Vala |

OTHER PUBLICATIONS

Hou, Chang-Yu, and Claudio Chamon. ""Wormhole" Geometry for Entrapping Topologically Protected Qubits in Non-Abelian Quantum Hall States and Probing Them with Voltage and Noise Measurements." Physical Review Letters 97.14 (2006).*

Bishara et al; Non-Abelian Anyons and Topological Quantum Computation, Published: Jul. 12, 2007, 15 pages http://arxiv.org/pdf/0707.1889v2.

Georgiev, Lachezar S.; Topologically Protected Quantum Gates for Computation with Non-Abelian Anyons in the Pfaffian Quantum Hall State; 6 pages; Published: Jul. 5, 2006, 5 pages; http://arxiv.org/pdf/cond-mat/0607125v3.

Sarma et al.; Topologically-Protected Qubits from a Possible Non-Abelian Fractional Quantum Hall State Published: Dec. 14, 2004; http://arxiv.org/pdf/cond-mat/0412343v2.

Bonderson et al.; Interferometry of non-Abelian Anyons, Published: Jul. 28, 2007, 62 pages http://arxiv.org/pdf/0707.4206v2.

Bonderson et al.; Measurement-Only Topological Quantum Computation via Anyonic Interferometry, Published: Aug. 14, 2008, 57 pages; http://arxiv.org/pdf/0808.1933v2.

(Continued)

*Primary Examiner* — Benjamin Sandvik
*Assistant Examiner* — Joseph Schoenholtz
(74) *Attorney, Agent, or Firm* — Condo Roccia LLP

(57) ABSTRACT

An implementation of a single qubit phase gate for use in a quantum information processing scheme based on the $\upsilon=5/2$ fractional quantum Hall (FQH) state is disclosed. Using sack geometry, a qubit consisting of two $\sigma$-quasiparticles, which may be isolated on respective antidots, may be separated by a constriction from the bulk of a two-dimensional electron gas in the $\upsilon=5/2$ FQH state. An edge quasiparticle may induce a phase gate on the qubit. The number of quasiparticles that are allowed to traverse the edge path defines which gate is induced. For example, if a certain number of quasiparticles are allowed to traverse the path, then a $\pi/8$ gate may be effected.

29 Claims, 2 Drawing Sheets

OTHER PUBLICATIONS

Averin et al.; Quantum Computation with Quasiparticles of the Fractional Quantum Hall Effect, Published: Oct. 10, 2001, 7 pages.; http://www.ee.sunysb.edu/~serge/ARW-5/Sample.doc.

Willett et al.; Measurement of filling factor 5/2 quasiparticle interference: observation of e/4 and e/2 period oscillations; Bell Laboratores, Alcatel-Lucent; 26 pages.

Hou et al.; "Wormhole" geometry for entrapping topologically-protected qubits in non-Abelian quantum Hall states and probing them with voltage and noise measurements; Mar. 6, 2006, 5 pages.

Bravyi, Sergey; Universal Quantum Computation with the $v = 5/2$ Fractional Quantum Hall State; IBM Watson Research Center; 17 pages.

* cited by examiner

USE OF SACK GEOMETRY TO IMPLEMENT A SINGLE QUBIT PHASE GATE

CROSS-REFERENCE TO RELATED APPLICATIONS

This application claims benefit under 35 U.S.C. §119(e) of provisional U.S. patent application Ser. No. 61/170,227, filed Apr. 17, 2009, the disclosure of which is incorporated herein by reference.

BACKGROUND

Quasiparticles of the $\upsilon=5/2$ fractional quantum Hall (FQH) state are known as Ising anyons. Evidence supporting the $\upsilon=5/2$ FQH state having non-Abelian anyons described by the Ising anyon model may be found, for example, at R. L. Willett, et al., *Measurement Of Filling Factor 5/2 Quasiparticle Interference: Observation Of Charge e/4 And e/2 Period Oscillations*, and W. Bishara, et al., *The Non-Abelian Interferometer*.

Though Ising anyons obey non-Abelian statistics, they do not have computationally universal braiding. That is, braiding transformations alone cannot generate a computationally universal gate set. Thus, in order to use them for quantum computation, it would be desirable to supplement the usual topologically-protected gates, which may be obtained either by braiding anyons or by using measurement-only anyonic quantum computation to generate braiding transformations without moving computational anyons. Measurement-only anyonic quantum computation is described and claimed in U.S. patent application Ser. No. 12/187,850, filed Aug. 7, 2008, the disclosure of which is incorporated herein by reference.

One gate that is desirable for quantum computation is the so-called $\pi/8$ phase gate, which is a one qubit gate. It would be desirable to generate this gate for Ising anyons in a way that does not require moving the computational anyons.

SUMMARY

Disclosed herein are approaches for implementing a single qubit phase gate in the $\upsilon=5/2$ FQH state using a variation of the so-called "sack geometry." Sack geometry is described in detail in Hou, et al.,*"Wormhole" Geometry For Entrapping Topologically-Protected Qubits In Non-Abelian Quantum Hall States And Probing Them With Voltage An Noise Measurements*.

Using sack geometry, a qubit consisting of two a-quasiparticles, which may be isolated on respective antidots, may be separated by a constriction from the bulk of a two-dimensional electron gas in the $\upsilon=5/2$ FQH state. An edge quasiparticle may induce a phase gate on the qubit. The number of σ-quasiparticles that are allowed to traverse the edge path, the tunneling strength, and the area of the sack, defines the gate. For example, if a certain number of σ-quasiparticles are allowed to traverse the edge path of a sack having a known area and tunneling strength, then a $\pi/8$ gate may be effected.

DETAILED DESCRIPTION

Use Of Sack Geometry To Implement A Phase Gate

Figure 1:
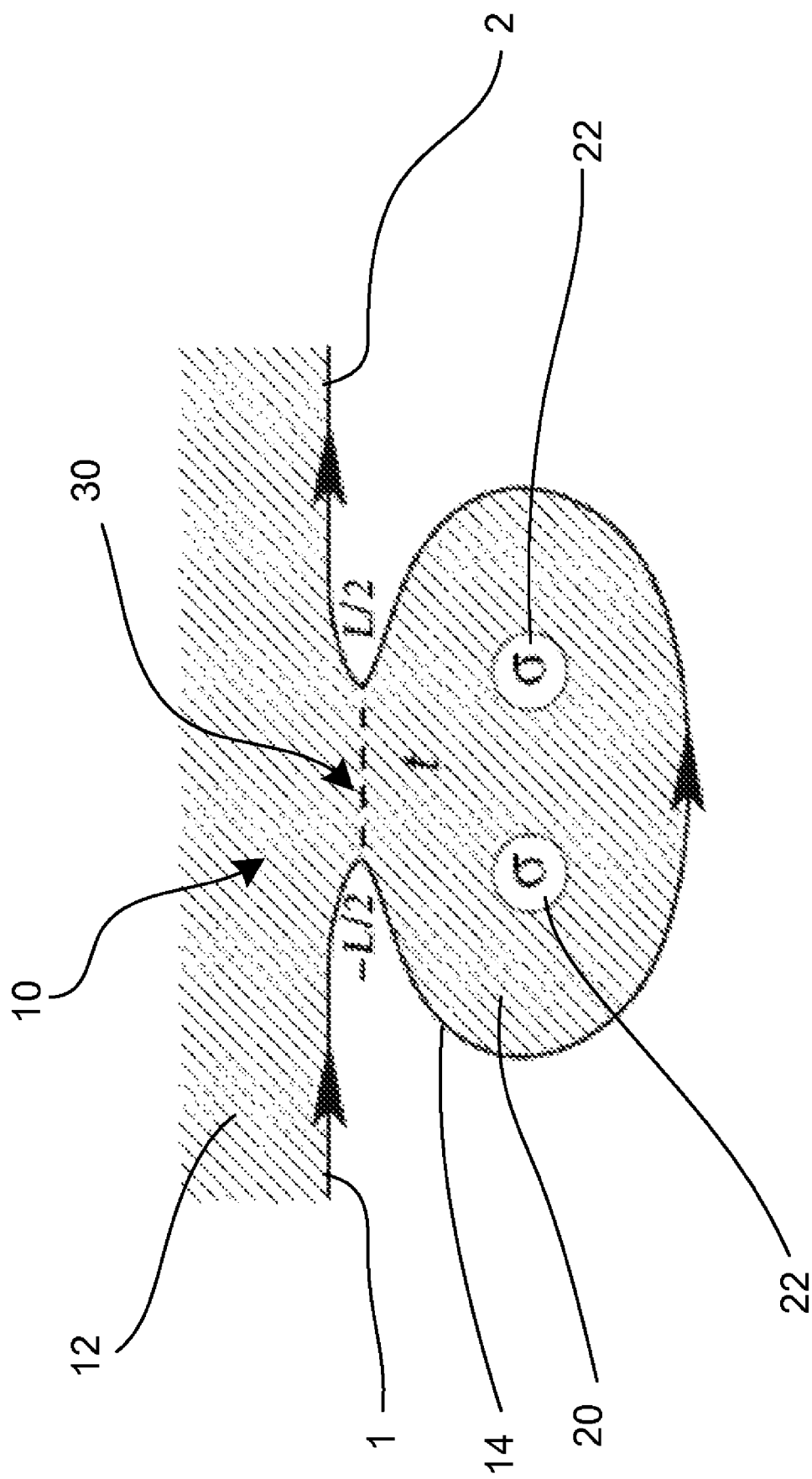
FIG. 1 depicts example sack geometry via which a single qubit phase gate may be implemented in the $\upsilon=5/2$ FQH state.

A qubit may consist of a pair of σ-quasiparticles, which may be isolated on respective antidots formed in an incompressible $\upsilon=5/2$ fractional quantum Hall (FQH) fluid. As shown in FIG. 1, such a qubit may be enclosed in a set-off region, or "sack," 20 of a two-dimensional electron gas (2DEG) 10 that is separated by a constriction 30 from the bulk 12 of the electron gas. Together, the two σ-quasiparticles 22 may either have the topological charge of the vacuum or of a fermion. These two possibilities form the |0> and |1> states of a qubit.

The constriction 30 may be viewed as a "pinched" portion of the edge 14 of the 2DEG 10. The relative phase of the |0> and |1> states may be adjusted by a process of closing and opening the constriction 30, i.e., changing the shape of the edge 14 of the 2DEG 10 to increase or decrease the size of the constriction 30. As shown, the edge 14 may be pinched to form a sack 20 around the pair of quasiparticles 22. The amount by which the relative phase advances is dependent on the time taken for the process, the strength of edge-state tunneling at the constriction (shown in dashed line in FIG. 1), and the area of the electron gas enclosed in the set-off region 20.

The process that causes the phase advancement may be visualized in a semi-classical, ballistic model of edge state quasiparticles. The only edge-state excitations that have a non-trivial effect on the qubit state are those carrying topological charge σ. After such an excitation enters the system from the left (as shown in FIG. 1), it may either traverse the entire bottom edge of the system or tunnel across at the constriction with an amplitude t. No matter what the state of the qubit, the quasiparticle will exit to the right.

Because the edge quasiparticle does not pass between the antidots, and its eventual path is unchanged by the qubit, it cannot change the probability of the qubit being in the |0> or |1> states. However, the relative phase between the two states may be altered, as the phase associated with each of the paths is dependent upon the state of the qubit.

To implement a phase gate, the system may first be calibrated to determine the area of the sack, the tunneling amplitude, $\Gamma$, at the constriction, and the amount of edge current flowing around the sack (shown as arrows in FIG. 1).

Though edge current will naturally flow around the sack by virtue of the geometry of the system, electrically conductive leads may be used to establish a particular edge current between two known points. As shown in FIG. 1, a first lead 1 may be connected to the edge 14 on one side of the constriction 30. A second lead 2 may be connected to the edge 14 on the other side of the constriction 30, such that the sack 20 is between the leads 1, 2. The edge current between the leads 1, 2 may be measured.

After the system is calibrated, it may be allowed to run for whatever amount of time is necessary to implement a desired gate. In other words, given that the area of the sack, the tunneling strength, and the edge current are known (from calibration), the amount of time for which the system is run is representative of the number of σ-quasiparticles that moved around the sack during that amount of time. And the gate that is implemented is determined by the number of σ-quasiparticles that moved around the sack. For example, this process may be used to generate a pi/8 phase gate by allowing edge current to flow around the sack, with a particular pair of quasiparticles inside the sack, for a specific amount of time. The pair may be chosen based on the manner in which the qubit is encoded.

Quasiparticles may be moved in and out of a fixed sack to keep them inside for the desired length of time, or a sack may be created and destroyed around the particular pair of quasiparticles for the desired length of time by deforming the edge (using, for example, the measurement-only method described in U.S. patent application Ser. No. 12/187,850).

Measurement-Only Anyonic Quantum Computation

Methods for performing measurement-only anyonic quantum computation are described in detail in U.S. patent application Ser. No. 12/187,850. Such a method may include measuring a first quantum state associated with a fractional quantum Hall (FQH) fluid, and measuring a first current associated with a first collective quantum state of a first collection of non-abelian anyons emergent in the FQH fluid. The non-abelian anyons may emerge as least-energy excitations of a system of real particles on which the fractional quantum Hall effect fluid is formed.

Measuring the current affects the collective quantum state of the collection of non-abelian anyons. A computation may be defined at least in part by the first current measurement. A second quantum state associated with the FQH fluid may be measured after the first current has been measured. A result of the computation may be determined based on the second quantum state.

The quantum states of the FQH fluid may be topological quantum states and may be measured interferometrically. An outcome of the interferometric measurement may be determined by measuring an edge current in the FQH fluid. Each interferometry measurement may include deforming an edge of the FQH fluid to form an interferometer in the FQH fluid, then performing the edge current measurement that gives the interferometry measurement, and then un-deforming the deformed edge to remove the interferometer. The interferometric measurement may be carried out by one or more probe anyons. The probe anyons may be provided by excitations in the edge current.

A sequence of edge-current measurements may be performed, the sequence defining a computation. Each of the edge-current measurements may be associated with a respective collection of non-abelian anyons emergent in the FQH fluid. For example, the sequence of edge-current measurements may include a first edge-current measurement associated with a first collection of non-abelian anyons, and a second edge-current measurement associated with a second collection of non-abelian anyons. The non-abelian anyons that form the second collection may be determined from an outcome of the first edge-current measurement.

The quantum states of the FQH fluid may be measured before and after the sequence of edge-current measurements have been performed. A result of the computation may be determined based on the change in quantum state.

Exemplary Computing Arrangement

Figure 2:
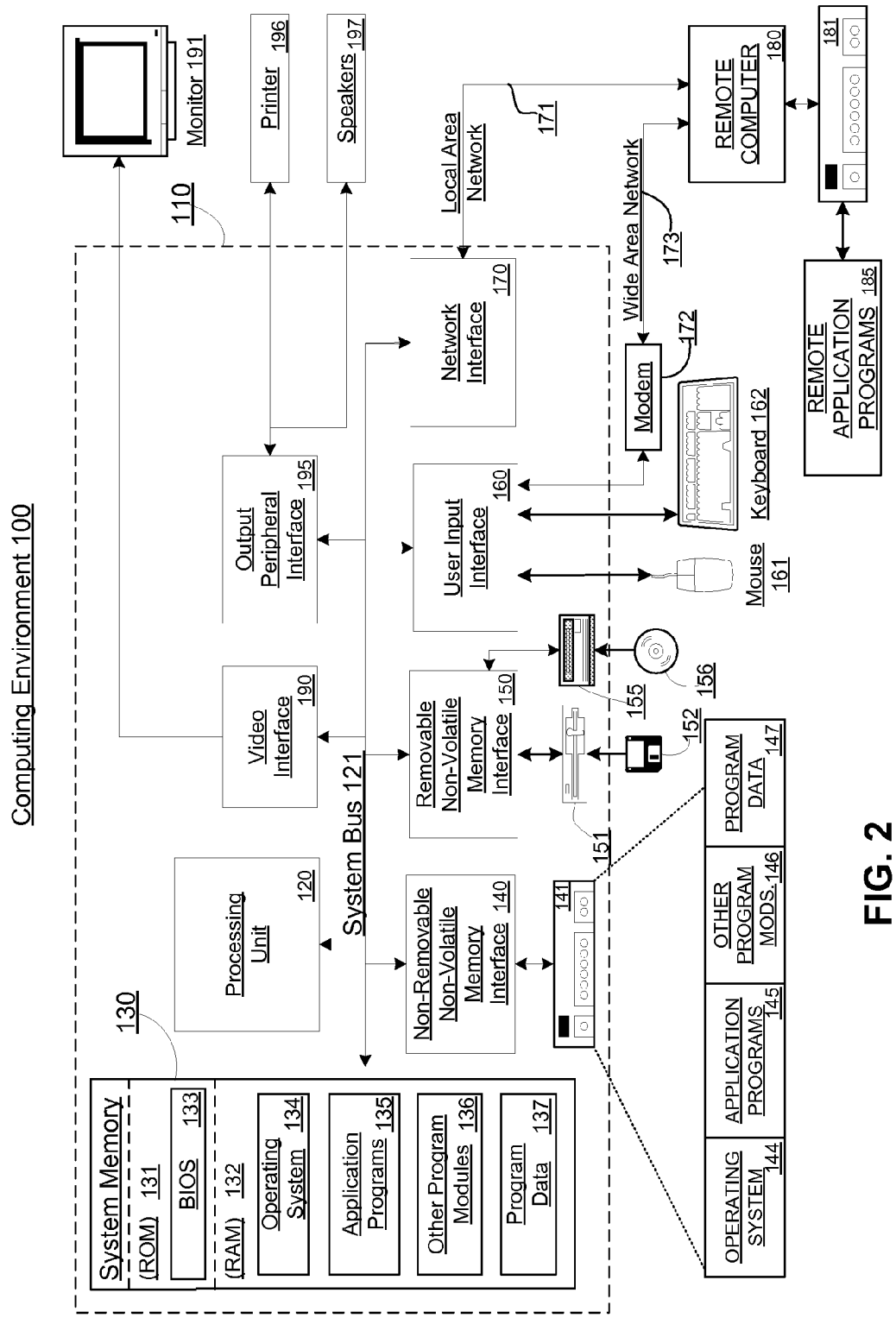
FIG. 2 depicts an example computing environment in which aspects of the example embodiments may be implemented.

FIG. 2 shows an example computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the example operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 2, an example system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are examples and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for implementing a single qubit phase gate, the method comprising:
    forming a set-off region in a bulk of two-dimensional electron gas, the set-off region defined by an edge of the electron gas;
    isolating first and second σ-quasiparticles on respective antidots formed in the set-off region;
    allowing an edge current to flow around the edge of the set-off region for an amount of time; and
    identifying a phase gate associated with the amount of time for which the edge current is allowed to flow around the edge of the set-off region.

2. The method of claim 1, wherein forming the set-off region comprises deforming an edge of the electron gas to form a constriction that defines the set-off region.

3. The method of claim 2, wherein the constriction separates the set-off region from the remainder of the bulk of the electron gas.

4. The method of claim 1, further comprising:
    determining a size of the set-off region, determining a tunneling strength associated with the set-off region, and determining the amount of edge current flowing around the set-off region.

5. The method of claim 4, wherein the amount of time for which the edge current is allowed to flow around the set-off region is based on the size of the set-off region, the tunneling strength associated with the set-off region, and the amount of edge current flowing around the set-off region.

6. The method of claim 1, wherein the σ-quasiparticles are non-abelian anyons.

7. The method of claim 6, wherein the σ-quasiparticles are Ising anyons.

8. The method of claim 1, wherein the phase gate is a $\pi/8$ phase gate.

9. The method of claim 1, wherein the electron gas is a υ=5/2 fractional quantum Hall fluid.

10. A single qubit phase gate, comprising:
a bulk of two-dimensional electron gas having an edge, a portion of the edge forming a constriction that separates a set-off region of the gas from the remainder of the bulk, wherein first and second σ-quasiparticles are disposed in the set-off region, and an edge current flows around the edge of the set-off region,
wherein the σ-quasiparticles are isolated on respective antidots formed in the electron gas.

11. The phase gate of claim 10, wherein the σ-quasiparticles define a qubit.

12. The phase gate of claim 10, further comprising:
current-measuring means for measuring the edge current flowing around the edge of the set-off region.

13. The phase gate of claim 10, further comprising: edge-deforming means for deforming the edge of the electron gas to alter a size of the constriction.

14. A method for implementing a single qubit phase gate, the method comprising:
isolating a pair of σ-quasiparticles on respective antidots formed in a set-off region in a two-dimensional electron gas in the υ=5/2 fractional quantum Hall state, wherein the set-off region is separated from the remainder of the gas by a constriction, the electron gas in the υ=5/2 fractional quantum Hall state, and the σ-quasiparticles define a qubit; and
inducing a phase gate on the qubit by allowing a number of σ-quasiparticles to traverse an edge of the set-off region.

15. The method of claim 14, wherein the .sigma.-quasiparticles have topological charges that form |0> and |1> states of the qubit.

16. The method of claim 15, further comprising:
adjusting a relative phase of the |0> and |1> states of the qubit by altering a size of the constriction.

17. The method of claim 16, wherein the relative phase advances by an amount that is based on an amount of time over which the size of the constriction is altered, a strength of edge current tunneling at the constriction, an amount of current flowing through the edge, and the area of the electron gas enclosed in the set-off region.

18. The method of claim 17, further comprising:
allowing the edge current to flow along the edge of the set-off region for a length of time that is based on the tunneling amplitude at the constriction and on an amount by which the phase is advanced due to a σ-quasiparticle traversing the edge of the set-off region.

19. A method for implementing a single qubit phase gate, the method comprising:
forming a set-off region in a bulk of two-dimensional electron gas, the set-off region defined by an edge of the electron gas;
isolating first and second σ-quasiparticles in the set-off region;
allowing an edge current to flow around the edge of the set-off region for an amount of time; and
identifying a π/8 phase gate associated with the amount of time for which the edge current is allowed to flow around the edge of the set-off region.

20. The method of claim 1, wherein forming the set-off region comprises deforming an edge of the electron gas to form a constriction that defines the set-off region.

21. The method of claim 2, wherein the constriction separates the set-off region from the remainder of the bulk of the electron gas.

22. The method of claim 1, further comprising:
determining a size of the set-off region, determining a tunneling strength associated with the set-off region, and determining the amount of edge current flowing around the set-off region.

23. The method of claim 4, wherein the amount of time for which the edge current is allowed to flow around the set-off region is based on the size of the set-off region, the tunneling strength associated with the set-off region, and the amount of edge current flowing around the set-off region.

24. The method of claim 1, wherein the σ-quasiparticles are non-abelian anyons.

25. The method of claim 6, wherein the σ-quasiparticles are Ising anyons.

26. The method of claim 1, wherein the electron gas is a υ=5/2 fractional quantum Hall fluid.

27. A single qubit phase gate, comprising:
a bulk of two-dimensional electron gas having an edge, a portion of the edge forming a constriction that separates a set-off region of the gas from the remainder of the bulk, and
edge-deforming means for deforming the edge of the electron gas to alter a size of the constriction,
wherein first and second σ-quasiparticles are disposed in the set-off region, and an edge current flows around the edge of the set-off region.

28. The phase gate of claim 27, wherein the σ-quasiparticles define a qubit.

29. The phase gate of claim 27, further comprising:
current-measuring means for measuring the edge current flowing around the edge of the set-off region.

* * * * *